United States Patent [19]

Kast et al.

[11] 4,395,882

[45] Aug. 2, 1983

[54] FREEZE PROTECTION APPARATUS FOR SOLAR COLLECTORS

[75] Inventors: Michael A. Kast, Menlo Park; David P. Bagshaw; Harry T. Whitehouse, both of Redwood City, all of Calif.

[73] Assignee: Sunspool Corporation, Palo Alto, Calif.

[21] Appl. No.: 236,096

[22] Filed: Feb. 20, 1981

Related U.S. Application Data

[63] Continuation-in-part of Ser. No. 960,399, Nov. 13, 1978, Pat. No. 4,280,478.

[51] Int. Cl.³ .............................................. F03G 7/06
[52] U.S. Cl. .......................................... 60/527; 60/528
[58] Field of Search ............... 219/301, 302, 530, 535, 219/540; 60/528, 513, 527

[56] References Cited

U.S. PATENT DOCUMENTS

| 2,687,626 | 8/1954 | Bartlowe | 219/301 X |
| 2,987,300 | 6/1961 | Greene | 219/302 X |
| 4,206,780 | 6/1980 | Manecke et al. | 60/528 X |

FOREIGN PATENT DOCUMENTS

| 2521754 | 11/1976 | Fed. Rep. of Germany | 219/302 |
| 2552139 | 6/1977 | Fed. Rep. of Germany | 219/301 |

*Primary Examiner*—Allen M. Ostrager
*Attorney, Agent, or Firm*—Alan H. MacPherson; Steven F. Caserza; Richard Franklin

[57] ABSTRACT

A support member is used to mount a heat motor and at least one electrical resistance heating element for actuating said heat motor. The support member is made of a thermally conductive material with cylindrical openings which receive the motor and heating element(s). Heat from the resistance element actuates the motor by heat conductance through the support.

9 Claims, 13 Drawing Figures

FREEZE PROTECTION APPARATUS FOR SOLAR COLLECTORS

RELATED APPLICATION

This is a continuation-in-part of patent application Ser. No. 960,399 filed Nov. 13, 1978 now U.S. Pat. No. 4,280,478.

BACKGROUND OF THE INVENTION

The need to conserve fossil fuels is only one reason why space heating, water heating and the like using the energy of the sun has received so much recent attention. For example, space heating utilizing solar energy flat-plate collectors is increasing in use. Typical solar collector systems utilize a flat-plate collector containing a metallic plate painted black, with one or two glass covers. The sides and bottom of the collector insulate the collector plate. About 90 percent of the solar energy transmitted through the glass and reaching the metallic plate is absorbed by the plate, increasing its temperature. The absorbed energy is, in turn, transferred to a working fluid—sometimes air or a liquid which is preferably (but not always) water.

If the working fluid is water, it is passed through tubes attached to the metallic plate. Water to be heated is pumped from a source to the tubing of solar collector where the plate-absorbed energy is transferred thereto, with the water acting as the thermal energy storage material for the system. The heated water is then returned to a storage tank where it remains until used for space heating or as a potable (hot) water supply.

While such solar collector systems enjoy widespread use, they are not without certain disadvantages. One of the more important and debilitating problems occurs when the temperature of the solar collector drops to or below the freezing point of the working fluid. When this occurs, the expansion of the frozen working fluid (water, for example) can severely damage the communicating pipes and tubing of the solar collector and system.

Various solutions to this problem have heretofore been proposed and used to some advantage—but not without concomitant disadvantages. For example, air may be used as the working fluid of the solar collector system. However, this requires a second energy transfer in order to heat water for home consumption. Moreover, in addition to being a poor energy storage material, air requires a relatively high blower power for circulation and bulkier ducts and flow passages.

Another solution contemplated is use of an antifreeze mixture as the working fluid of sufficient concentration to preclude freezing under the most severe weather conditions reasonably expected in the locale in which the solar collector system is being used. Unfortunately, this solution also has a number of drawbacks. The antifreeze mixture can be expensive and subject to frequent replacement. Moreover, the longevity of many antifreeze chemicals is tied to the maximum surface temperature experienced. For example, propylene glycol cannot be used where temperatures may exceed 300° F., a value which can easily be reached and exceeded by many presently known collectors under no flow or stagnation conditions. Thus, a working fluid including propylene, glycol may avoid freeze damage for only a short period—or until the working temperatures seriously mitigate the (freeze protection) usefulness of the mixture. Further, an additional energy transfer must be made via a heat exchanger in order to isolate the antifreeze mixture from space heating or domestic water heating applications. The heat exchanger typically requires specialized and costly equipment (e.g., heat exchange bundle, expansion tank, secondary pressure relief, antifreeze solution).

Another method of protecting solar collector systems from freeze damage, and one to which this invention is directed, involves draining the collector array when freezing or near freezing conditions are detected. This technique (typically referred to as a "drain-down" technique) requires the collector array to be designed with suitable provisions for gravity drainage and air control for proper draining of the array and subsequent refilling. A number of advantages are obtained by this method over those discussed above. For example, if water is the working fluid (as it usually is), the need for heat exchanger equipment and antifreeze chemical treatment is avoided since the water can be circulated through the collector array for heating and used directly.

Solar collector systems utilizing this latter approach to freeze protection typically feature an electromechanical (e.g., solenoid) actuated valve in combination with a temperature sensing device to monitor the working fluid (water) contained in the collector array. When the temperature of working fluid in the collector drops to a first predetermined level, the sensor interrupts electrical current to the valve actuator, causing the actuator to interrupt communication of the water to and from the storage tank and to open a drain path for water contained in the array so that it may drain from the array before it freezes. When the ambient temperature rises to a second predetermined level—above the first—the sensor again communicates electrical current to the actuator to close the drain path and reopen communication between the array and the storage tank of other facility. Examples of this type of system may be seen in U.S. Pat. Nos. 3,812,872 and 4,044,754.

While this latter technique may be advantageous in many respects, it is not without certain undesirable difficulties. For example, valve malfunctions frequently occur due to particle contamination in flow and/or control parts. Such contamination will cause the valve to stick and fail to provide the necessary drain and flow control functions when needed. Furthermore, since the actuators are usually of a fast-action type (e.g., the valve is opened or closed in fractions of a second), components of the solar collector system can be severely damaged due to hydraulic surges or water hammering during fill operation.

Moreover, many drain-down schemes employing electromechanically operated valves utilize significant quantities of electrical energy. This problem is magnified by the requirement for "fail-safe" draining operation in the event of medium or long-term power outage. To achieve a fail-safe drain-down capability, the apparatus must be preloaded to return to a drain configuration when the power is lost. In practice, this requires that certain components be continually energized (e.g., in a standby state). Thus, while the operational period of the solar collection equipment is limited to daylight hours, the drain-down apparatus will require standby power on a twenty-four hour basis. Under these conditions, the electrical energy consumption of conventional electromechanical valves can become significant when compared to the energy savings afforded by the collector array.

Drain-down configurations using electromechanically operated valves are also prone to "false" drain-down cycles caused by momentary power losses on the order of seconds or minutes. Such behavior unnecessarily stresses ancillary drain-down components such as the automatic air vents.

Too, drain-down schemes comprised of discrete electromechanical valves often result in a collector filling operation (after draining) which introduces water to one leg of the collector array only. This is particularly true of systems which incorporate a check valve to both prevent reverse circulation at night and to serve as a positive isolation between the collector array and source pressure in the drain-down mode. Such a filling procedure frequently leads to the entrapment of air in the communicating lines of the system.

SUMMARY OF THE INVENTION

The present invention provides freeze protection apparatus for a solar collector system that drains the working fluid when the temperature of the fluid contained in the collector array approaches a predetermined level; apparatus that is inexpensive, designed for exceptional long life and avoids many of the problems set forth above.

According to the present invention, therefore, there is provided freeze protection apparatus that includes a valve assembly interposed in the tubing that communicates the working fluid to and from the collector array, an actuator for operating the valve and a temperature monitoring sensor. The valve houses an elongated valve member that is axially cycled by the actuator from a first position to a second position via an intermediate position. When in the first position the valve member forms passages with the valve assembly that communicate the working fluid source to the inlet conduit of the collector array. When in the second position fluid passages are formed that simultaneously communicate the input and output conduits of the collector array to the drainpipe to allow the working fluid to drain from the collector array.

The actuator is electrically intercoupled with a temperature sensing device (which can take several forms) so that when the temperature of the working fluid contained in the array drops to a first predetermined level the sensor effects actuation of the valve stem to the second position to drain the collector.

When the ambient temperature of the collector array rises to a second (safe) predetermined level, the sensor again effects actuation of the valve assembly. The valve member is moved from the second position back to the first position via the intermediate position that shuts the drain and temporarily forms fluid passages that communicate the fluid supply to both input and outlet conduits of the array. The array is thereby quickly filled in a manner that avoids air being trapped in the fluid lines of the system.

In the preferred embodiment, the valve assembly includes a housing with a cylindrical bore formed therein and a valve cartridge, containing the valve member, removably inserted in the bore. The housing and cartridge have a number of ports formed in each, positioned so that the ports of the housing can be concentrically aligned with those of the cartridge, the ports extending into a throughbore formed in the cartridge. The valve member is essentially of the spool valve variety and is in the shape of an elongated valve stem having cylindrical, band-like sections of increased diameter (relative to the stem) at spaced locations along the stem. The valve member is axially translatable within the cartridge between the first, intermediate and second positions. Depending upon the position of the valve member, the cylindrical sections engage various annular seals formed in the throughbore of the cartridge to seal off certain fluid passages while other fluid passages are opened or created by channels formed between the sections of the valve member of reduced diameter (e.g., the stem) and the interior of the cartridge. All flow ports are configured to minimize the possibility of particulate entrapment.

The actuator can take several forms, but the preferred embodiment is comprised of two insulated, thermally activated devices containing thermostatic material which expands upon heating. The expansion of this material is triggered by a solid-to-liquid phase change which occurs in the 160°–180° F. range. The combined expansion of the two actuating devices is used to axially move the valve member.

The sensor which is positioned on the solar collector array to monitor the working fluid contained therein, electrically couples (either directly or indirectly through appropriate control hardware) an electric current to the heater element of the actuator. When the temperature of the working fluid contained in the collector array drops to a first predetermined level, the sensor causes the electric current to the actuator to be interrupted, causing the thermostatic material to cool, contract and, in turn, a spring moves the valve member from the first position to the second position, permitting the working fluid to drain from the solar collector array.

When the ambient temperature of the collector array rises to a second predetermined level (e.g., a temperature above the freezing point of the working fluid of the system) the sensor will re-apply electric current to the actuator which, in turn, will begin to move the valve member axially from the second position to the first position.

A number of advantages are achieved by the present invention described herein. First, the particular valve arrangement disclosed allows positive draining of the working fluid from the collector array when the ambient temperature of the array approaches the freezing point of the working fluid. Freeze damage is thereby avoided without having to use a working fluid comprising antifreeze components and the concomitant debilitating features thereof.

Further, due to the thermal insulation around the actuator, the energy consumption is very low and the actuator is slow acting. The standby power consumption of the actuator assembly is dramatically lower than that of comparable electromechanical assemblies. The power consumption is controlled by the amount of thermal insulation around the actuating devices and heating element which supplies energy to the devices. In addition to the lower power consumption, the combined effects of the insulation and heating element give rise to an operational time constant of several minutes.

Valve member movement between the first and second positions is on the order of minutes. Accordingly, the actuator is relatively insensitive to and can "mask" short-term (e.g., seconds or even minutes) power outages. The debilitating and damaging effects of water hammer and other associated surge phenomena usually associated with fast-acting solenoid actuated valve arrangements are thereby avoided. Moreover, this delay feature allows the valve member to slowly traverse the intermediate position (when moving from the second to the first position) wherein the valve member forms fluid passages with the cartridge that communicates the working fluid to both input and output conduits of the collector array. This feature allows the collector array to be filled while avoiding the possibility of air being trapped in the input or output lines thereof.

A further advantage is obtained by using a valve cartridge/valve member assembly that is removably inserted in a housing to form the valve assembly. With the cartridge removed, the respective working fluid lines can be connected to the housing by soldering or the like. With the cartridge removed from the housing, the heat generated by the soldering process will not damage the valve seals (typically a rubberized composition) contained in the cartridge. Further, the cartridge assembly can be easily removed for maintenance without having to tamper with fluid communicating pipes of the system.

As a feature of this invention a unique ball check assembly is provided integral with the valve. This assembly acts as a check valve to prevent draining of the collector during a time period such as night when the collector is full but no water is being circulated through the system. At this time the integral ball check valve prevents both forward and reverse thermosiphon flow while the valve remains energized and the system full. This is achieved while at the same time minimizing the pressure drop through the valve during the forward flow of the fluid through the collector to the hot water collection tank. The check valve assembly comprises a ball which is pressed by a selected spring force against a seat on the inlet from the collector during absence of flow from the collector thereby preventing reverse thermosiphoning of the water from the collector but which, during forward flow, is easily disengaged from its seat and pushed against a stop thereby allowing the fluid to flow from the collector with minimum pressure drop. During the nonflow of fluid when the ball is seated, the ball is held seated by a light spring force thereby to prevent forward thermosiphoning (the flow of water due to natural convection forces in the forward direction through the valve).

While prior art valves were designed to prevent reverse thermocycling, the ball check valve used in accordance with this invention is so sensitive that an additional phenomenon was observed in systems using this valve. This phenomenon, called "forward thermocycling", is similar to reverse thermocycling in that once it starts it proceeds as rapidly as reverse thermocycling to siphon hot water from the storage tank to the collector. In the collector the hot water radiates heat to the atmosphere and thus cools before returning to the storage tank. Just as in reverse thermocycling where water in the collector cools rather than heats and thus dissipates previously stored heat from the hot water storage tank, forward thermocycling, once it starts (due to an instability in the system, for example), proceeds just as rapidly and yields the same result—a rapid cooling of the water in the hot water storage tank. In accordance with this invention, the forward thermocycling is avoided by using a spring of a selected light force to hold the ball against the seat. The spring pressure is selected to be low enough to minimize the pressure drop during the forward flow. At the other end of the ball chamber is a stop which prevents damage to the ball and the spring holding the ball against the seat due to pressure surges, too large a pump for the system, or the sudden surge of water when a valve is opened either during installation or repair which causes a corresponding pressure surge.

As an additional feature of this invention, the end of the valve stem is fluted so as to render the end asymmetric. The fluting prevents the stem from fluttering upon withdrawal by creating a fluid flow pressure asymmetry due to the preferential passage of fluid through the fluted portion of the end of the stem.

As an additional feature of the invention, the spool is teflon coated to prevent scaling and to provide a self lubricated surface.

A novel container for the heating element used with the actuator of this invention comprises an aluminum extrusion which is both inexpensive and efficient in the transfer of heat from the resistive heater to the actuator (also called a "heat motor") used to control the valve. The heating element-aluminum extrusion is shaped to hold both the heat motor and the resistive heater while at the same time serving as a conduit for the transfer of heat from the resistive heater to the motor.

For a better understanding of the present invention, together with other and further features and advantages thereof, reference is had to the following description taken in conjunction with the accompanying drawings, the scope of the invention being pointed out in the claims appended hereto.

DETAILED DESCRIPTION OF THE INVENTION

Figures 1, 2:
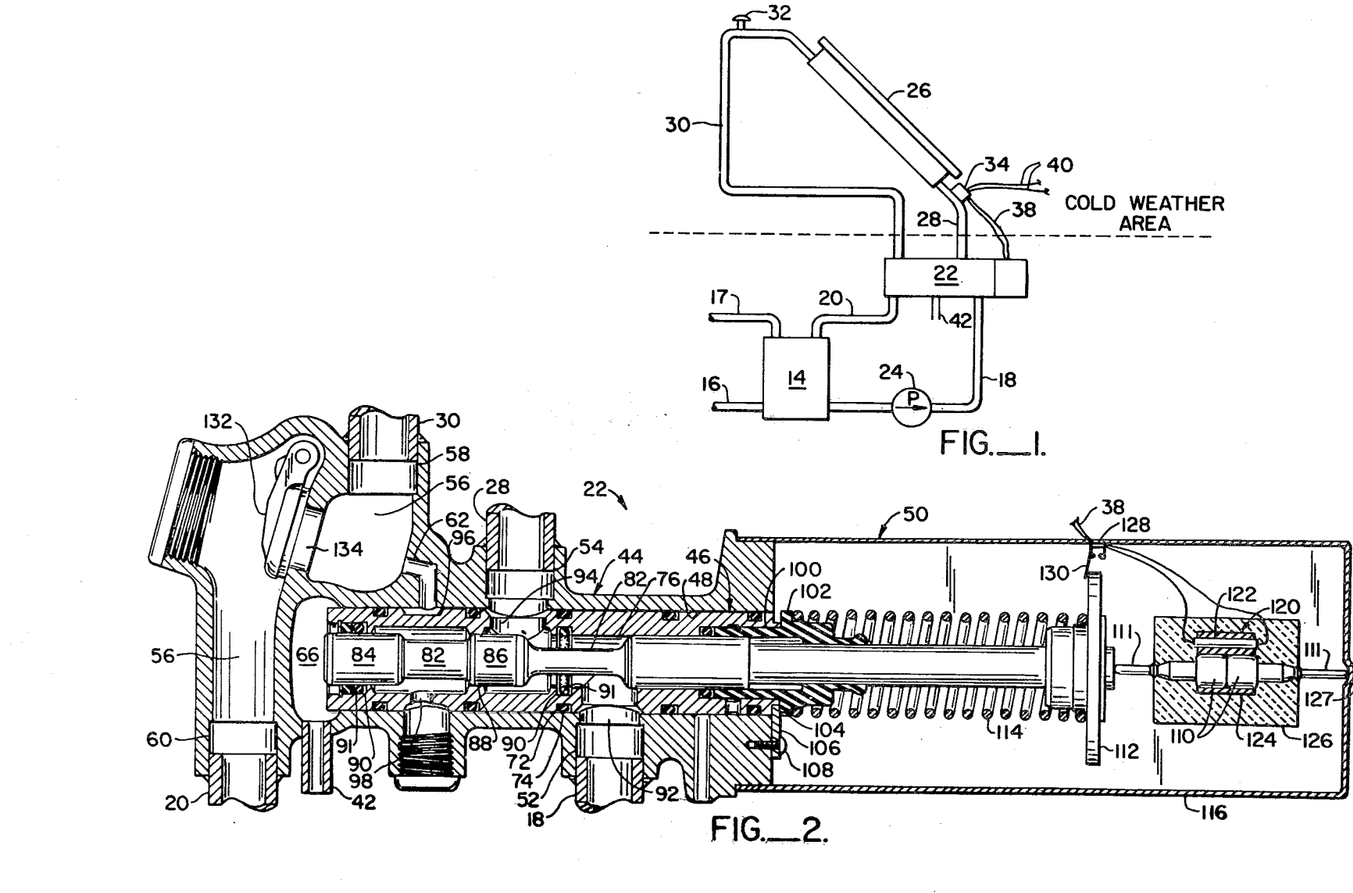
FIG. 1 is a diagrammatic view of a solar collector system having the freeze protection mechanism of the present invention embodied therein.
FIG. 2 is a sectional side view illustrating, in detail, the valve apparatus used in the present invention, showing the valve member situated in the first position for communicating cold waterline of the system to the input line of the collector array.

Turning now to the drawings, which illustrate one embodiment of the present invention, there is seen in FIG. 1 the diagram of a typical solar collector system for heating a working fluid. For the purposes of simplifying the description of the present invention, it will be assumed that the working fluid is water, although it should be evident that a number of other types of working fluid can be utilized. Thus, a typical solar collector system for heating the water includes a storage tank 14 with waterline 16 for communicating water to be heated from such sources as the city water supply or the like and line 17 for communicating warmed water from the storage tank for utilization. Cold waterline 18 and warm waterline 20 establish fluid communication between the storage tank 14 and valve mechanism 22. A fluid pump 24 is inserted in the cold waterline 18 to maintain flow of the water through the system.

A valve mechanism 22 is also connected to collector array 26 via collector input and output lines 28 and 30. Mounted to the output line 30 is an automatic air vent 32. A sensor 34 is mounted to the collector array 26 to monitor the temperature of the working fluid contained in the array. Electric wires 38 transmit electric current, received via input terminals 40 from a source (not shown), to the valve mechanism for operation thereof, as will be more fully described below.

Generally, solar collection systems of the type illustrated accept water to be heated via line 16 from a potable water supply or source (not shown) and circulate that water through the collector array 26 and to tank 14 where it is stored for subsequent transmission via line 17 to whatever utilization means may be involved. Thus, water to be warmed is pumped from the storage tank 14 by pump 24 via cold waterline 18, through valve mechanism 22 to collector input line 28. The water is circulated through the collector array 26 where it is heated and returned to storage tank 14 via the collector output line 30, valve mechanism 22 and warm waterline 20. The warmed water remains in storage tank 14 until used or until it requires further heating. In the latter case the water is again circulated through the collector array 26 and returned to storage tank 14.

The above-described operation of the solar collector system of FIG. 1 is typical of many, if not all, similar systems in use today. If, however, the temperature of the water contained in collector array 26 approaches its freezing point, action must be taken to avoid having the water freeze in and thereby damage the array. It is to this problem that the present invention is directed. Thus, sensor 34 monitors the temperature of the water in the array 26 and, when the water temperature drops to a first predetermined level, acts to cause valve mechanism 22 to interrupt communication between cold waterline 18 and collector input 28. In addition, valve mechanism 22 communicates both the input and output lines of the collector array to a drainpipe 42, permitting water to gravity drain from the collector array. When the ambient temperature of the collector array 26 rises to a second predetermined level, valve mechanism 22, upon command from sensor 34, closes drainpipe 42 and temporarily communicates cold waterline 18 to both collector input and output lines 28 and 30 to fill the collector array. When filled, water flow from cold waterline 18 to collector output line 30 is interrupted.

Figure 3:
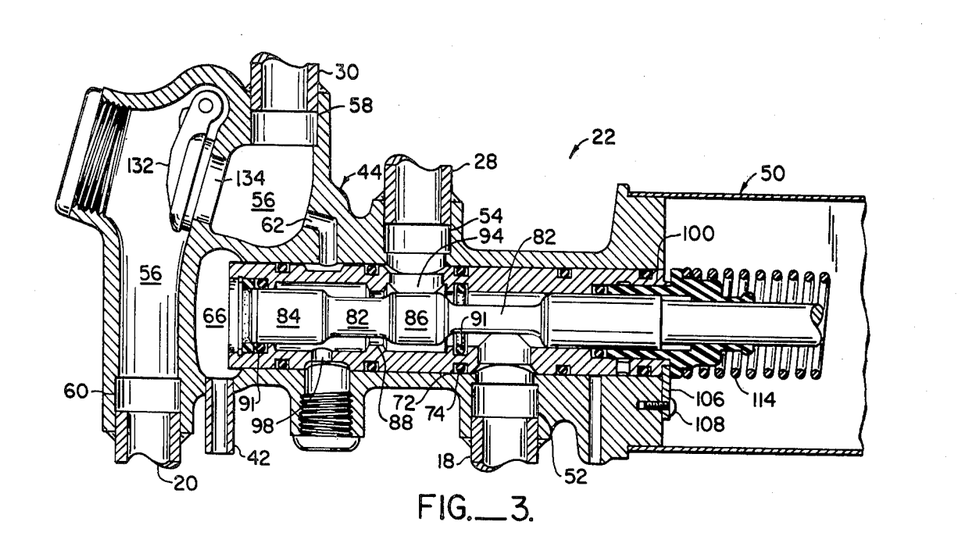
FIGS. 3 and 4 are fragmentary views, partly in section, of the valve of FIG. 2, showing the valve member in an intermediate and a second position, respectively.
Figure 4:
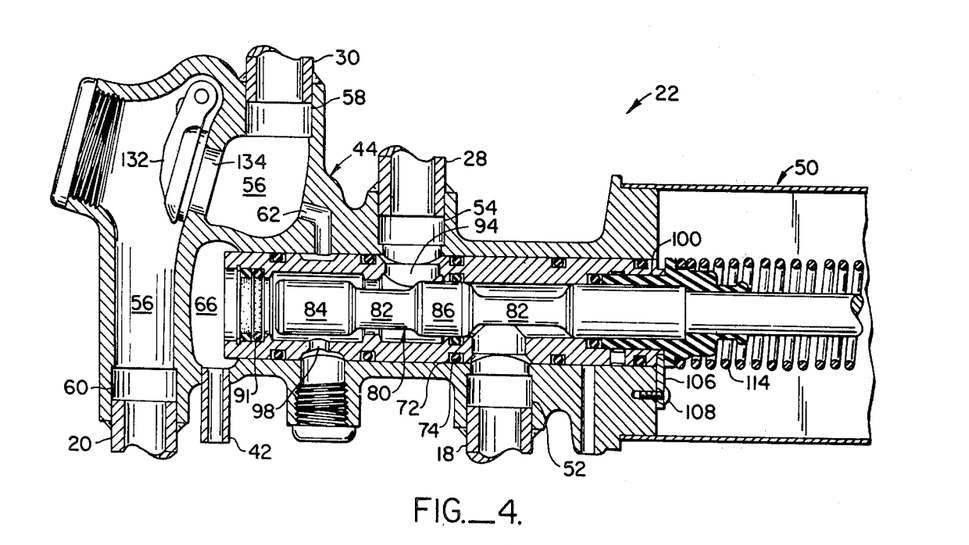

Turning now to FIGS. 2 through 4, the specific embodiment of valve mechanism 22 presently contemplated will now be described. As shown, valve mechanism 22 includes housing 44, with valve cartridge 46 inserted in an elongate, generally cylindrical bore 48 formed in the housing, and actuator 50. Formed in housing 44 and extending into bore 48 are first and second ports 52 and 54, respectively. Port 52 accepts and is connected to cold waterline 18, while the second port 54 is connected to input line 28 of the collector array 26. Also formed in housing 44 is fluid duct 56, having third and fourth ports 58 and 60, respectively. As illustrated, third port 58 of housing 44 is connected to output line 30 of the collector array while the fourth port 60 has connected thereto warm waterline 20 of the system. A fluid passage 62 communicates the duct 56 to bore 48 of the housing.

Formed at one end of bore 48 is a drain chamber 66 with drainpipe 42 extending through the housing and into the drain chamber.

Bore 48 of the valve housing removably holds valve cartridge 46, which is sized and configured to fit snugly within the bore, yet be easily removed therefrom. Valve cartridge 46 is generally cylindrical shaped with a number of circumferential recesses 73 formed in the outer surface thereof that hold annular seals 74. Extending axially through the cartridge 46 is a cylindrical throughbore 76 which holds valve member 80. Valve member 80 is formed from an elongate stem 82 having cylindrical spool sections 84 and 86 formed thereon. As can be seen, spool sections 84 and 86 are of a diameter greater than that of the stem 82. Formed on the interior surface of the throughbore 76 and oriented circumferentially is annular ring 88 which is dimensioned and configured to establish sealing engagement with the spool section 86. Throughbore 76 is also provided with circumferential recesses 90, each holding an annular seal 91 therein.

A pair of orifices 92 and 94 are formed in valve cartridge 46 to extend into the throughbore 76. The orifices are positioned so that when the cartridge 46 is appropriately inserted and located within bore 48 of housing 44, the orifices 92 and 94 are concentrically aligned with ports 52 and 54, respectively. Finally, formed circumferentially about the outer surface of the cartridge 46 is a fluid channel 96 which, with aperture 98 extending into the throughbore 76, forms a passage that communicates fluid duct 56 to the throughbore 76 of the cartridge via passage 62, channel 96 and aperture 98.

Force-fitted in the outer end of cartridge 46 is main seal 100 having a radially extending flange 102 positioned to form a clearance 104 for accepting key 106 to removably hold the cartridge within the housing. The key is attached to the housing by any appropriate fastening apparatus such as, for example, a bolt 108. Attached to the housing-cartridge combination for axial translation of valve member 80 is actuator 50 which includes two back-to-back thermostatic actuation elements 110, 110, pressure plate 112 and helical spring 114. Pressure plate 112 is mounted to the exterior end of valve member 80 with helical spring 114 mounted about the external portion of the valve member and between the plate and flange 102 of main seal 100 so as to bias the valve members axially toward thermostatic actuator element 110. A cap 116 encloses the components of actuator 50.

The thermostatic actuator elements 110, 110 are of a type which transforms temperature changes into useful mechanical energy in the form of piston movement. Each thermostatic actuator element 110 contains a specially formulated material with a carefully controlled thermal expansion property to produce a volumetric expansion. Thus, when heated, each actuator element 110 converts expansion of the material contained into axial movement of piston 111. As illustrated in FIG. 2, actuator elements 110, 110 are mounted between cap 116 and pressure plate 112 back-to-back so that as the heater material expands, piston 122 causes concomitant axial translation of the valve element 80 against the bias of spring 114.

Such thermostatic actuating elements are readily available on the market today and it is presently contemplated that a thermostatic actuator sold by the Fulton Sylphon Division of Robertshaw Controls Company of Knoxville, Tenn. will be used; the specific actuator in mind is designated by the Robertshaw Controls Company by part number 98067-A and sold under the "powerpill" trademark, a registered trademark of Robertshaw Controls Company.

To effect the required temperature change that is transformed into mechanical energy by actuator elements 110, 110, heater element 120 is provided. Heater element 120 is shown as including an axial lead resistor 122 mounted in an aluminum block 124. Aluminum block 124 is described in more detail below in conjunction with the description of FIGS. 5a and 5b. Also mounted in block 124 are the actuator elements 110, 110. Surrounding the heating element 120 is insulation 126. Both the resistor 122 and actuator elements 110, 110 are snugly held by block 124 to ensure good thermal conductivity therebetween. The actuating elements/-heater element/insulation combination is held in place by an appropriate means, together with dimple 127, to maintain the relative axial alignment of the combination.

The nature of the thermostatic actuating elements described herein is such that the power consumed by the elements during the on or quiescent state can be lowered through the use of thermal insulation shown as insulation 126. By insulating the heater and actuating elements, the power consumed by each actuating element 110 during its quiescent state is dramatically lower than that of comparable electromechanical assemblies.

Electric current is communicated to resistor 122, usually from the houshold supply (not shown), via electrical lines 38 from, as described above, sensor 34. In this way, electric current is transformed into heat by resistor 122 to warm actuator elements 110, 110 (via aluminum block 124) and ultimately effect movement of valve element 80.

Micro-switch 128 is mounted proximate and in the path of travel of pressure plate 112. When the thermostatic actuating element has moved valve element 80 a sufficient distance to place it in the first position (the position illustrated in FIG. 2 corresponding to normal operation of the system of FIG. 1 with the collector 26 full of water), the outer periphery of pressure plate 112 comes into contact with and engages arm 130 of the micro-switch to open a set of normally closed contact points. This, in turn, breaks communication of electrical current to heater element 120. The material in actuating elements 110, 110 cools, contracts and spring 114 biases pressure plate 112 away from the housing 44. Arm 130 is disengaged, the contacts of micro-switch 128 close and electric current is re-established to heater element 120 and the cycle begins anew. In this manner valve member 80 is subjected to a slight axial oscillation which, it is believed, prevents valve seals from causing excessively high break-away friction forces, a common problem with elastomeric seals.

Having described the construction of the valve assembly contemplated for use, its function and operation can now be described in connection with protecting the solar collector array from freeze damage. First, assume normal operating conditions (i.e., collector 26 full of water) and that the temperature of the water contained in the array is above its freezing point. Accordingly, electric current is supplied to the heater element 120 of the thermostatic actuator 50 via sensor 34 to cause the actuator to axially translate valve element 80 to a first position illustrated in FIG. 2. As can be seen, the spool section 86 of the valve element is placed in sealing engagement with annular seal ring 88. With the valve element so positioned, the reduced portions of the valve element (i.e., stem 82) forms a fluid passage with throughbore 76 of cartridge 46 that, together with concentrically aligned port-aperture combinations 52, 92 and 54, 94, respectively, establish communication between cold waterline 18 and collector input line 28. Warmed water is returned from the collector array to valve mechanism 22 by output line 30. The water passes through the valve mechanism via duct 56 to warm waterline 20 which communicates the warmed water to storage tank 14 (FIG. 1).

In order to prevent reverse thermosiphoning of warmed water from the storage tank and back (i.e., reverse thermosiphoning is where water enters valve 22 through line 20 from tank 14 and leaves valve 22 through line 30) through duct 56, a gravity-operated check valve 132 is pivotally mounted within duct 56. During periods of no fluid flow through the collector, check valve 132 closes upon duct orifice 134 and prevents reverse thermosiphoning. When forward circulation of water in the system 10 (FIG. 1) is resumed by pump 24, the pressure of the fluid will be sufficient to work against the gravity pull upon check valve 132 to open it and allow forward water flow to commence through duct 56 (i.e., water enters valve 22 through duct 30 and leaves through duct 20).

In the event the temperature of the water approaches its freezing point, sensor 34 (which can be, for example, a precision thermostatic switch such as that manufactured by Texas Instruments and designated by part number 4344-176) interrupts the electric current communicated to actuator 50 via electrical lines 38 when the water temperature drops to a first predetermined level. Thus, when the first predetermined level is reached (usually set at a few degrees above the freezing point of water) electric current is removed from heater element 120 and the material contained in the thermostatic actuating elements 110 begins to cool and contract. The bias of helical spring 114 begins to take command and to move valve element 80 axially out of the cartridge-housing assembly.

Because of the particular features of the thermostatic actuator presently contemplated, the movement of the valve element from its first position (FIG. 2), through an intermediate position (FIG. 3), to its second position (FIG. 4) is completed in approximately five or six minutes. This time delay is, of course, a function of the particular actuator element 110 selected, the insulation of the actuator element and the bias loading applied by helical spring 114. While valve element 80 traverses the initial portions of the intermediate position, there exists a short period during which sealing engagement between the valve element and the seals 88, 91 which border orifice 94, is broken. This allows pressurized water to flow through throughbore 76, resulting in a flushing action that serves to clear our any residual debris that may have collected within the cartridge; such debris, if left to accumulate, could damage seals 88 and 91 of the cartridge-valve element assembly.

If electric current remains interrupted to heat element 120 the second position (FIG. 4) is reached, placing spool section 86 in sealing engagement with annular seal 90 of the cartridge. This position effectively closes cold waterline 18. Concomitantly, both the collector array input and output lines 28 and 30 are now in fluid communication with drainpipe 42. As FIG. 4 illustrates, input line 28 of the solar collector is communicated to the drainpipe 42 via the channel formed between reduced section (e.g., stem 82) of the valve element 80

(between cylindrical spool sections 84 and 86) and seal 88, around spool section 84 and into drain chamber 66. Similarly, output line 30 of the solar collector is communicated to the drain chamber via duct 56, passage 62, annular channel 96 (about the cartridge 46), aperture 98, and into drain chamber 66. Thus, both the input and output lines 28 and 30 of the solar collector are allowed to drain simultaneously.

Once the collector array 26 has been drained of water, it is protected from freeze damage. If the temperature of the collector subsequently returns to a safe level, the system 10 may again be put into operation. Accordingly, sensor 34 causes electrical communication to be re-established between input terminals 40 and heater element 120. The actuating elements 110, 110 are warmed, the material contained therein expands and commences axial translation of the valve element 80 from the second position (FIG. 4) to the first position (FIG. 2). However, because of the inherent delay referred to above, the valve element 80 again moves through the intermediate position (FIG. 3) with some delay and a number of further advantages. As FIG. 3 illustrates, while in this intermediate position (and moving toward the first position) cold waterline 18 is placed in communication with both input and output pipes 28 and 30 of the collector array. Accordingly, the collector array is filled via both the input and output lines simultaneously, forcing the air in the lines 28 and 30 upward where it is vented by air vent 32.

Housing 44, cartridge 46, and cap 116 are preferably manufactured from a material having relatively good heat conductive properties, such as brass or the like. The reason for this resides in the fact that the power consumption of the actuator is tied to the valve's operating temperature in a beneficial way. When operating, the valve mechanism is warmed by the heated water passing therethrough (e.g., through duct 56) from the collector to the storage facility. In turn, heat is transferred to the housing, cartridge and cap which helps warm thermostatic actuating element 120. Thus, the electrical energy requirement for holding the actuating element in an energized state is reduced.

The check valve assembly of this invention is shown in more detail in FIGS. 6a through 6d. 6a shows a cross-sectional view of check valve 600. Valve 600 comprises a chamber 602 in which is ball 601 (which typically has a specific gravity between 0.98 and 1.02). Preferably ball 601 is formed of ethylenepropylene and is somewhat elastic so as not to deform under the fluid flow pressure. While ball 601 may be buoyant, it is not necessary that it be so given spring 605, the function of which will be described shortly. In operation, ball 601 will rotate in chamber 602 so that the particular portion of the surface of the ball in contact with the various seats and springs within chamber 602 changes so as to prevent undue wear on any one portion of the surface of ball 601. Screwed into the top portion of chamber 602 is a check seat 607b preferably formed of polysulfone. Polysulfone is capable of withstanding high temperatures and therefore will withstand the temperatures created by soldering the valve of this invention into the system in which is to be used. Formed on the bottom portion of insert 607b is seat 607a. Seat 607a is angled and is shown in more detail in the cross-section shown in FIG. 6c. Seat 607a is angled at about a 45° angle from the vertical and is circular in shape so as to receive and be in contact around its total circumference with a portion of ball 601 when ball 601 is pushed against seat 607a. Polysulfone material resists scale and therefore keeps the seat 607a clean ensuring a good seal as a function of time and use.

Ball 601 moves up and contacts seat 607a in response to fluid flowing into chamber 601 through pipe 609. Pipe 609 (corresponding to pipe 20 in FIGS. 1 and 2) is preferably connected to the inlet to the hot water storage tank 14 (FIG. 1) and thus normally serves as the outlet from chamber 602. When fluid is being pumped into chamber 602 through inlet pipe 612 (corresponding to pipe 30 in FIGS. 1 and 2) and inlet 608 formed through polysulfone insert 607b, ball 601 is forced down and away from seat 607a. The fluid, typically water, entering chamber 602 travels around ball 601 in chamber 602. The inner walls of chamber 602 are fluted to provide low resistance flow passages around ball 601 as shown in cross-section in FIG. 6c. Ridges 603a through 603d keep ball 601 reasonably centered in chamber 602 while cavities 604a through 604d comprise flow passages of sufficient cross-section to allow the water being pumped into chamber 602 to pass through chamber 602 and out of the chamber through pipe 609 with very little flow resistance. Ball 601 is forced down against spring 605 which has a force carefully selected to be sufficient to keep ball 601 placed firmly against seal 607a unless the pressure in pipe 612 relative to the pressure in pipe 609 exceeds a selected level, typically about 7 to 10 grams. When, however, it is desired to pump water into the collector, spring 605 does not offer significant resistance to the flow of fluid and therefore ball 601 can be rather easily moved away from seat 607a in response to flow pressure from the pump. The pump energy consumed by the flow resistance of value 600 is small. However, spring 605 is designed to provide sufficient force to prevent ball 601 from being forced away from seat 607a through the normal hydrostatic pressures developed when the system wishes to forward thermosiphon. While reverse thermosiphoning in solar energy systems is well-known, forward thermosiphoning is a phenomenon which has only been discovered through the use of the value of this invention. This value is sufficiently sensitive to allow this phenomenon to be detected. Forward thermosiphoning is caused by the cooling of the fluid left in the collector overnight. As the fluid (such as water) cools, the fluid in the collector becomes more dense than the fluid in the hot water storage tank and any instability in the system which results in the fluid starting to move in the forward direction will immediately create a siphoning effect which rapidly drains the hot water from the hot water storage tank 14 (FIG. 1) through the collector thereby cooling the water in the hot water storage tank. Because the thermosiphoning forces are quite small, a spring 605 with 7 to 10 grams force is adequate to hold ball 601 against seat 607a in one embodiment and prevent forward thermocycling. However, this spring force is still low enough to minimize the pressure drop when the pump is pumping the fluid in the forward direction and the collector is acting as a heater rather than a cooler. Particularly, the size of this spring can be experimentally determined by measurements of the differential pressures across ball 601 at the initiation of forward fluid flow. Typically, this spring is stainless steel and provides both forward and reverse thermosiphoning checking action, thereby preventing either of these phenomenon from occurring. Reverse thermosiphoning is prevented bexause spring 605 forces ball 601 against seat 607a upon stoppage of forward flow of fluid through the collector 26 (FIG. 1).

Figures 6A, 6B, 6C, 6D:
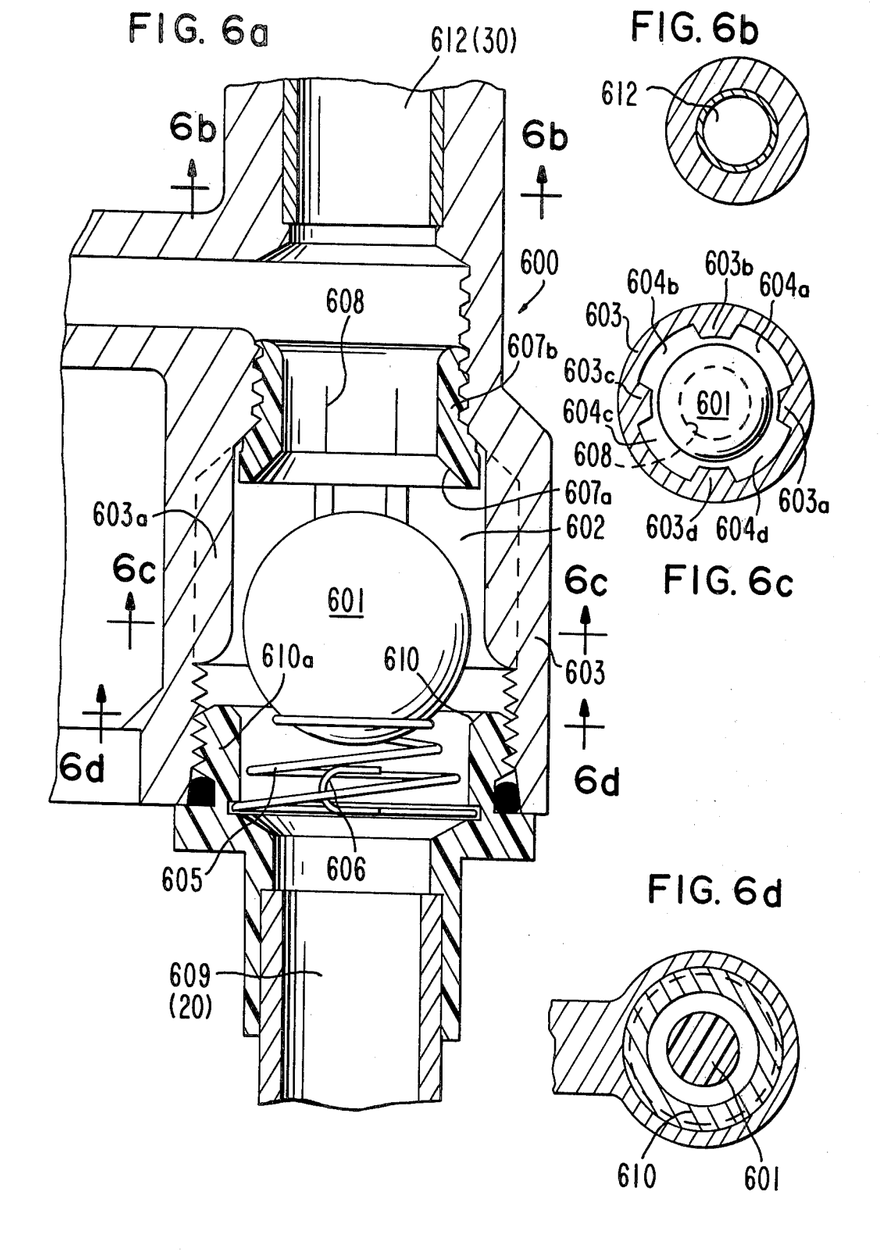
FIGS. 6a to 6d illustrate the ball check valve useful in the valve structure of this invention and certain cross-sections thereof.

A stop 606 is placed at the bottom of spring 605 to prevent spring 605 from being compressed unduly and to prevent ball 601 from blocking forward flow once the pump is on. Beveled seat 610 is provided to prevent sharp edges on insert 610a from scarring the surface of ball 601.

FIG. 6d shows the cross-section of the valve at the intersection of seat 610 with the interface of insert 610a.

Figures 5A, 5B:
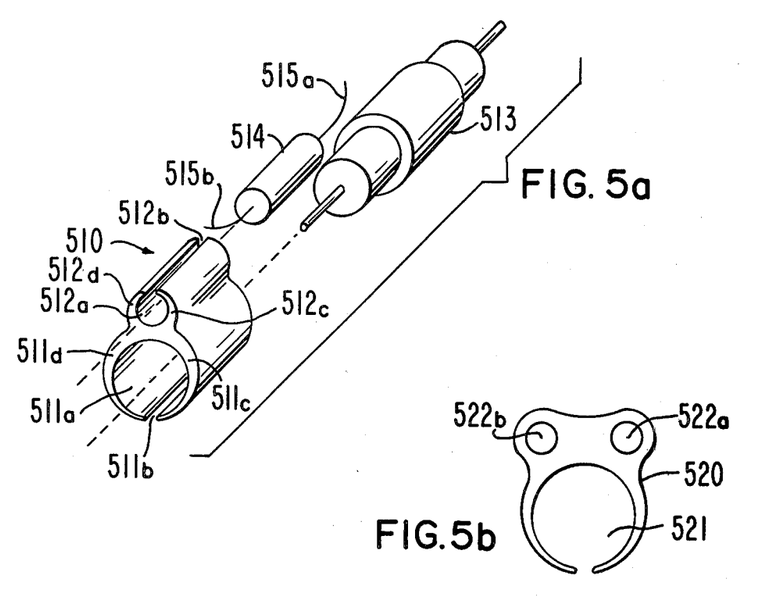
FIGS. 5a and 5b illustrate the unitary aluminum extrusion used to hold the heat motor (i.e., actuator) and resistive heater utilized with the valve of this invention.

FIG. 5 illustrates a single aluminum extrusion 510 particularly useful to form block 124 (FIG. 2) in accordance with this invention. Extrusion 510 contains a cylindrical opening 512a sized to receive the body of a standard resistor 514. In one embodiment, resistor 514 is a wire wound resistor with a vitreous enamel or ceramic insulating body which is mounted in opening 512a using an epoxy. Extrusion 510 also contains cylindrical opening 511a located adjacent to opening 512a. Opening 511a is sized to receive in a press fit relationship the body of power pill 513. Cylindrical openings 512a and 511a each contain an open slot 512b and 511b, respectively, running along one length of the cylindrical opening thereby to allow the arms 512c and 512d and 511c and 511d surrounding cylindrical openings 512a and 511a, respectively, to flex and receive the resistor and power pill, respectively. Thus, aluminum extrusion 510 provides structural support for power pill 513. Preferably, extrusion 510 is long enough to allow power pill 513 to contain two power pills mounted back to back so as to generate the necessary total travel for the particular application described above.

The press fit feature of cylindrical opening 511a provides the high thermal conductance from the heater 514 to the power pill 513 which is necessary for good transient response of the system. The aluminum body provides a high conductivity thermal path between resistor 514 and pill 513. The high conductivity of the aluminum permits the eccentric positioning of the resistor 514 with respect to power pill 513 while maintaining essentially isothermal heating conditions around the entire circumference of the heat motor 513. The strong conduction path also permits the resistor to be operated above its nominal rating in that the aluminum extrusion and power pill assembly 513 act as an efficient heat sink.

The resistor cavity 512a provides an easy, inexpensive and safe way of using a standard power resistor 514 as heating source. Other prior art electrically heated power pill devices rely on awkward and expensive ceramic insulating collars for electrical insulation. Typically these collars are wrapped with bare or minimumly-insulated resistance wire. Such heat assemblies are costly, bulky, and have poor thermal communication with the heat motor. In the structure shown in FIG. 5, the power resistor utilizes its inherent insulation so a simple epoxy encapsulation provides total electrical insulation while preserving good thermal contact.

The structure shown in FIG. 5 can be applied to any diameter heat pill or motor 513 and a wide variety of power resistors, including possibly multiple power resistors. FIG. 5b illustrates and end view showing an aluminum extrusion similar to that shown in FIG. 5a suitable for use with two resistors. It should be understood that a plurality of resistors can, in general, be used with the structure of this invention, if desired. Alternatively, a temperature sensor can be placed in one opening in extrusion 520 to provide temperature signals for use in controlling power pill 513. In FIG. 5b, aluminum extrusion 520 includes a cylindrical opening 521 for receiving the power pill 513 and openings 522a and 522b for receiving two resistors or a resistor and a temperature sensor. The structures of FIGS. 5a and 5b can be mounted in any of a variety of ways, including the use of a clip or by means of any epoxy, or by any other appropriate mechanical means.

Figure 7A:
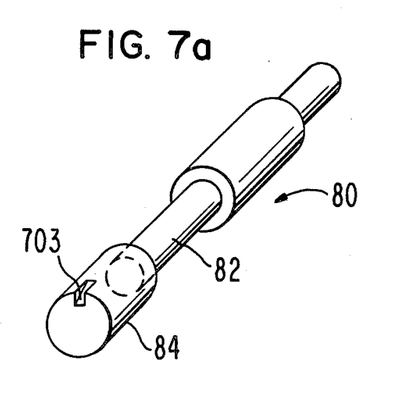
FIGS. 7a, 7b and 7c illustrate the notched end of the spool which eliminates spool flutter of the valve stem during movement of the stem.
Figure 7B:
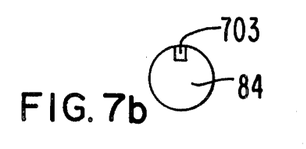
Figure 7C:
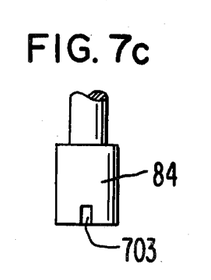

FIGS. 7a, 7b, and 7c show the notching of the end of the stem 80 (FIG. 4) of the valve of this invention. Notch 703 is formed in the end of cylindrical spool section 84 of stem 80 as shown in FIG. 7a. Notch 703 allows an asymmetric flow pattern to develop as the core is being moved through the valve housing 44 due to a temperature change and thereby prevents the fluttering or vibrating of the cylindrical stem 80 as this stem is withdrawn or inserted into bore 48 (FIG. 2). FIGS. 7b and 7c show an end view and a top view, respectively, of cylindrical portion 84 with notch 703 formed therein. Notch 703 is beveled in one embodiment but can take other shapes as appropriate. Thus in the embodiment shown, the end of valve stem 80 comprises a cylindrical spool 84 and notch 703 is formed to extend angularly across the intersection of the side and end of spool 84.

In one embodiment stem 80 is teflon coated to reduce the formation of scale and to provide a low friction surface on stem 80 for ease of moving stem 80. The teflon coating can comprise a material such as TFE or PTFE.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. Structure which comprises:
    a support member for holding at least one heating element and at least one heat motor, said support member having a first end and a second end containing respectively a first face and a second face, said first and second faces being substantially parallel to each other, said support member comprising a thermally conductive material and including a first cylindrical opening extending from said first face to said second face thereby forming a cylindrical hole through said support member, said first cylindrical opening being adapted for receipt of said at least one heat motor, and at least one second cylindrical opening formed through said support member from said first face to said second face parallel to said first cylindrical opening, said second cylindrical opening being adapted for receipt of at least one heating element;
    at least one heat motor mounted in said first opening, said support member supporting said at least one heat motor such that when said at least one heat motor is heated and thus expands, it is retained to expand along the axis of said first cylindrical opening; and
    a resistive element mounted in said second cylindrical opening to serve as said at least one heating element.

2. Structure as in claim 1 wherein said heat motor is press fit in said first cylindrical opening.

3. Structure as in claim 1 wherein said heating element comprises a resistive heater which is epoxied in said second opening.

4. Structure as in claim 1 wherein said first cylindrical opening comprises two arms shaped so as to form a cylindrical enclosure, said two arms approaching but not touching each other at their extremities so as to leave unclosed a portion of said cylindrical enclosure.

5. Structure as in claim 1 wherein said at least one second cylindrical opening comprises a single opening which is formed of two arms shaped to form a cylindrical enclosure, said two arms approaching but not touching each other at their extremities so as to leave open one portion of said cylindrical surface.

6. Structure as in claim 1 wherein said at least one second cylindrical opening comprises a plurality of openings in said structure for receipt of a plurality of heating elements.

7. Structure as in claim 1 wherein said thermally conductive material comprises aluminum.

8. Structure as in claim 1 wherein said at least one second cylindrical opening comprises two openings and said structure further includes:
   a temperature sensor placed in one of said two openings, said temperature sensor providing signals to turn on and off said at least one heating element.

9. Structure as in claim 8 wherein said at least one heat motor comprises two heat motors thereby to double the expansion capable of being achieved compared to the expansion achievable with one heat motor.

* * * * *